[54] MACHINE FOR FORMING UNBROKEN RINGS, OR SIMILAR, OF DOUGH OUT OF STRIPS OF MOISTENED AND KNEADED FLOUR

[75] Inventors: Giulio Folli, Conselice-Ravenna; Marino Casadei, Cesena, both of Italy

[73] Assignee: Folli Giulio & Dante, di Folli Giulio, Folli Renzo & Preti Fosca s.n.c., Conselice-Ravenna, Italy

[21] Appl. No.: 506,120

[22] Filed: Jun. 20, 1983

[30] Foreign Application Priority Data

Jul. 30, 1982 [IT] Italy ................................ 3503 A/82

[51] Int. Cl.³ .......................... A21C 3/02; A21C 3/08
[52] U.S. Cl. .................................. 425/320; 425/324.1; 425/334; 425/335; 425/337; 425/341; 425/363; 425/375
[58] Field of Search ..................... 425/289, 335, 324.1, 425/296, 320, 322, 363, 375, 334, 337, 341

[56] References Cited
U.S. PATENT DOCUMENTS 2,008,181  7/1935  Kemp ................................. 425/335
2,691,351 10/1954  Turner ............................... 425/335
3,186,359  6/1965  Centrone .......................... 425/324.1

Primary Examiner—Willard E. Hoag
Attorney, Agent, or Firm—Balogh, Osann, Kramer, Dvorak, Genova & Traub

[57] ABSTRACT

Disclosed herein is an invention that belongs to the technical field of machines or equipment for bakeries and relates, in particular, to a machine for forming unbroken rings, or similar, of dough out of strips of moistened and kneaded flour.

The technical problem that has to be solved is how to construct a machine of this nature which, despite being simple and of a relatively reduced volume, is able to handle contemporaneously many strips of dough and, above all, has the ability to prevent the strips from undergoing force harmful to the formation of dough of a particular shape, for example an unbroken ring.

A solution to the problem is achieved with a machine for forming shaped pieces out of strips of moistened and kneaded flour, comprising drive and guide elements whose structure is such that they are able to keep the said strips virtually parallel with one another, and to give each of the said strips a flow trajectory defined by a succession of essentially rectilinear sections, angularly deviated, by a plurality of deflection means, placed side by side, along at least one deviation line, inclined with respect to the flow trajectory, the strips being forwarded downwards the deviation line, inclined with respect to the flow trajectory, in such a way as to define between each couple of strips therebelow, a distance greater than that one between each couple of strips of dough over the flow trajectory, thereby corresponding to the distance between the forming devices.

13 Claims, 4 Drawing Figures

MACHINE FOR FORMING UNBROKEN RINGS, OR SIMILAR, OF DOUGH OUT OF STRIPS OF MOISTENED AND KNEADED FLOUR

BACKGROUND OF THE INVENTION

The invention relates to a machine for forming unbroken rings, or similar, of dough out of strips of moistened and kneaded flour and, in particular, to a machine that executes the said operations automatically.

DESCRIPTION OF THE PRIOR ART

As is known, machines of a special nature that are able to form automatically shaped pieces of dough out of moistened and kneaded flour divided into strips there on, have been studied. These machines comprise devices for manipulating the moistened and kneaded flour and for supplying the dough in strips which, after being engaged by drive and guide elements, are placed by special forming devices in the required position, for example, in a position whereby unbroken rings are formed.

One example of such automatic machines is constituted by the machine described in Italian Pat. No. 3353 A/80.

Although the machines in question offer, from numerous viewpoints, many advantages, technically speaking they are relatively unsatisfactory as regards one basic problem, namely the channelling of the strips of dough from the manipulation devices to the forming devices. The manipulation devices, in fact, handle compact dough and, per force, form a number of strips placed very close to one another. The forming devices that shape the individual pieces of dough require, instead, a relatively ample space and need, therefore, to be supplied with strips of dough that are a certain distance away from one another.

In practice, the strips have to be spaced one with respect to the other in between the manipulation devices and the forming devices.

The one and only technical method able to satisfy the said requirement is, apparently, to give the said strips trajectories between the manipulation devices and the forming devices that are angularly divergent, one with respect to the other, essentially in the form of spokes.

This, on one hand, noticeably increases the volume of the machine in question and, on the other, subjects the said strips of dough to dangerous tension.

To widen the strips of dough in the form of spokes does, in fact, enlarge considerably the area occupied by the said machines in the region of the forming devices, where there is one per strip of dough. Alternatively, it is necessary to reduce notably the number of strips of dough created by the manipulation devices. Furthermore, the deviations imposed on the said strips give way to kinks and, at the time the dough is being formed into shaped pieces, can cause these to be malformed.

In the patent mentioned above it is envisaged, for example, that the strips of dough be carried forward towards the forming devices by a conveyor belt and that the trajectories that diverge in the form of spokes be made obligatory by guides or rollers hung onto the said conveyor belt that constitute walls for restraining and channelling the strips of dough. The contrast between the linear motion of the conveyor belt and the diverging directions of the said guides or rollers creates on the strips of dough a strong kinking tendency, and this deviation from the normal course hampers, for example, the correct shaping of the dough in unbroken rings.

One important negative consequence of the tension to which the strips of dough are subjected when moving from the manipulation devices to the forming devices also lies in the fact that the forming devices have to be constructed in such a way as to prevent carefully further tension on the strips of dough. In this connection, by way of an example, the patent mentioned above explains how to construct forming devices constituted by a plurality of tubular elements, the lower extremity of which can be swung along a required trajectory, and the upper extremity of which is virtually fixed so as to receive the strips of dough without them undergoing force. It is obvious, however, that tubular elements made in this way are somewhat complex to manufacture since they require precise ball and socket joints for the said upper extremities.

To overcome the aforementioned difficulties is not at all easy if one stops to consider that the manipulation devices are necessarily somewhat small in size, while the forming devices must preferably be kept side by side and aligned one with the other in order to allow them to be controlled synchronously by common transmission means.

The technical task placed as the basis for the invention is to solve the technical problem of how to channel the strips of dough towards the forming devices without causing the said strips to undergo tension and without rendering the structure of the forming machinery too bulky.

SUMMARY OF THE INVENTION

One important object of the invention that falls within the framework of the said technical task is to make available a machine for forming unbroken rings, or similar, of dough that is structurally very simple and can easily adopted by industries in the field concerned.

Another object of the invention is to make available a machine for forming unbroken rings, or similar, of dough in which all the moving parts are of a simple structure.

The said technical task and the said objects are attained by a machine, according to the invention, for forming unbroken rings, or similar, of dough out of strips of moistened and kneaded flour, which comprises at least: devices for manipulating the moistened and kneaded flour and for creating from this, a plurality of continuous side by side strips of dough, devices for forming individual shaped pieces out of the strips of dough, drive and guide elements for channelling the strips of dough from the manipulation devices to the forming devices, and means for powering and controlling the devices and the elements, wherein the structure of the drive and guide elements is such as to keep the strips of dough virtually parallel with one another and to give each of the strips a flow trajectory defined by a succession of essentially rectilinear sections, angularly deviated, by a plurality of deflection means, placed side by side, along at least one deviation line, inclined with respect to the flow trajectory, the strips being forwarded downwards the deviation line, inclined with respect to the flow trajectory, in such a way as to define between each couple of strips therebelow, a distance greater than that one between each couple of strips of dough over the flow trajectory, thereby corresponding to the distance between the forming devices.

BRIEF DESCRIPTION OF THE DRAWINGS

Further characteristics and advantages will become more apparent from the description of two preferred embodiments for a machine for forming unbroken rings, or similar, of dough, illustrated purely as an unlimited example on the accompanying drawings, in which.

DESCRIPTION OF THE PREFERRED EMBODIMENTS

Figure 1:
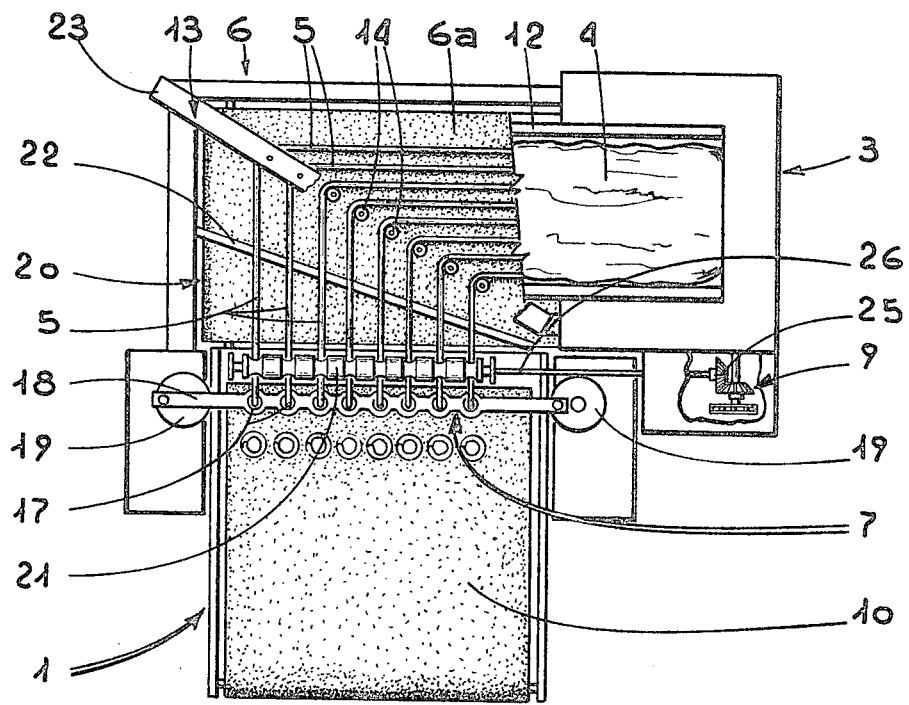
FIG. 1 shows, in a plan view, the machine according to the invention in a first preferred embodiment.

With reference to the above listed figures, the forming machine according to the invention is shown globally at 1.

In both of the preferred embodiments illustrated, the machine has: a support frame 2 onto which extend the various parts of the machine 1, devices 3 for manipulating the moistened and kneaded flour 4, designed to form strips of dough 5, elements 6 for driving and guiding the strips of dough 5, devices 7 for forming individual shaped pieces of dough 8, powering and control means 9, and means 10 for conveying the shaped pieces of dough 8. More in detail and again in a way common to both of the described embodiments, the manipulation devices are constituted, in a way in itself known, by a pair of thinning rollers 11 supplied by means of a chute 12.

The said thinning rollers 11 are placed above the said drive and guide means 6 in which are comprised elements intended to define a support surface 6a for the strips 5 and transmission means 13 constituted by side by side deviation rollers 14.

An inventive novelty is that the strips of dough 5 describe a flow trajectory defined by a succession of essentially rectilinear sections, while the deviation rollers 14 define a deviation line for the said strips that forms unequal angles between the said rectilinear sections placed upstream and downstream. In practice, the deviation line formed by the deviation rollers 14 creates with the strips 5 moving away there from, angles less close to 90° than the angles formed with the strips arriving from the manipulation devices 3 and flowing towards the said deviation line.

At the end of the flow trajectory of each strip of dough 5, an essentially vertical final or terminal section is defined and this is inserted into the said forming devices 7. The latter, the deviation rollers 14 and the thinning rollers 11 are so arranged as to maintain parallelism constant between the strips of dough 5. The latter describe at least two rectilinear sections, the first of which on the said support elements that define the support surface 6a, and the second, virtually vertical, inserted into the forming devices 7. The deviation rollers 14 are placed at least immediately downstream of the said first rectilinear section of the strips of dough 5.

Figure 2:
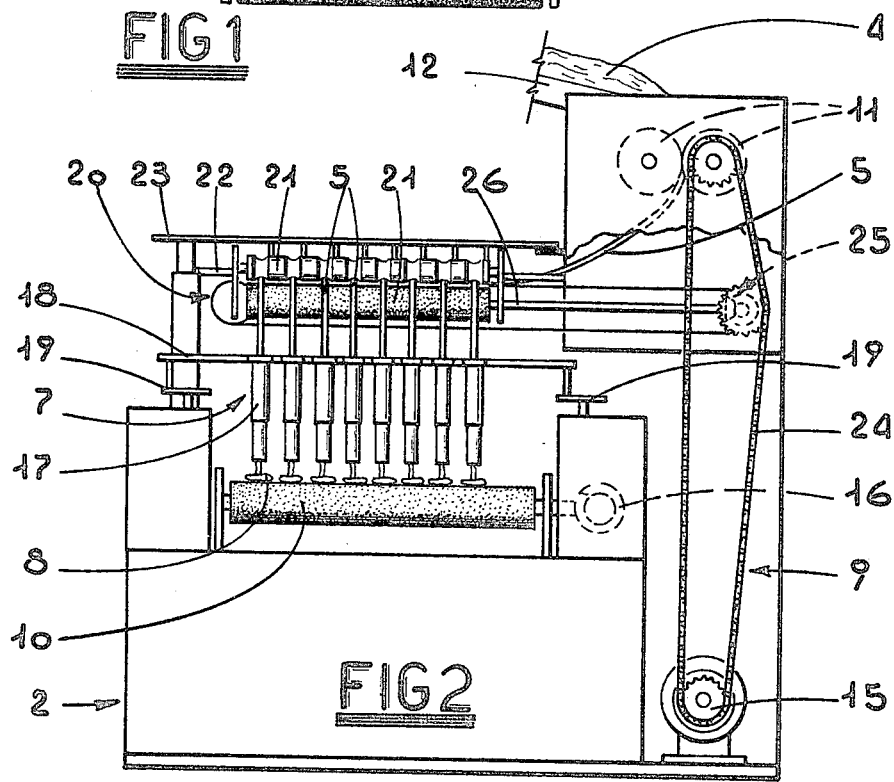
FIGS. 2 and 3 show, in a front view and in a lateral view, respectively, the machine depicted in FIG. 1.

Again in a way common to both of the described embodiments, provision is made for powering and control means 9 that set in contemporaneous operation, through a prime mover 15 shown in FIG. 2, one thinning roller 11 and the drive means 6, and furnish, through a secondary motor 16, also shown in FIG. 2, oscillating movement to the forming devices 7.

The latter are constituted, in a way in itself known, by essentially vertical tubular elements 17 designed to receive at the upper extremity thereof, the strips of dough 5 and positioned with the lower extremity thereof in the region of the conveyor means 10, and by means, in themselves known, for cutting the shaped pieces 8.

According to one characteristic of the invention, the tubular elements 17 are envisaged as all being integral with a sustaining bar 18, the extremities of which engage with cranks 19 rotatable in a horizontal plane under the action of the secondary motor 16.

The two embodiments illustrated for the machine 1 according to the invention differ substantially in the structure of the drive and guide means 6.

Figure 3:
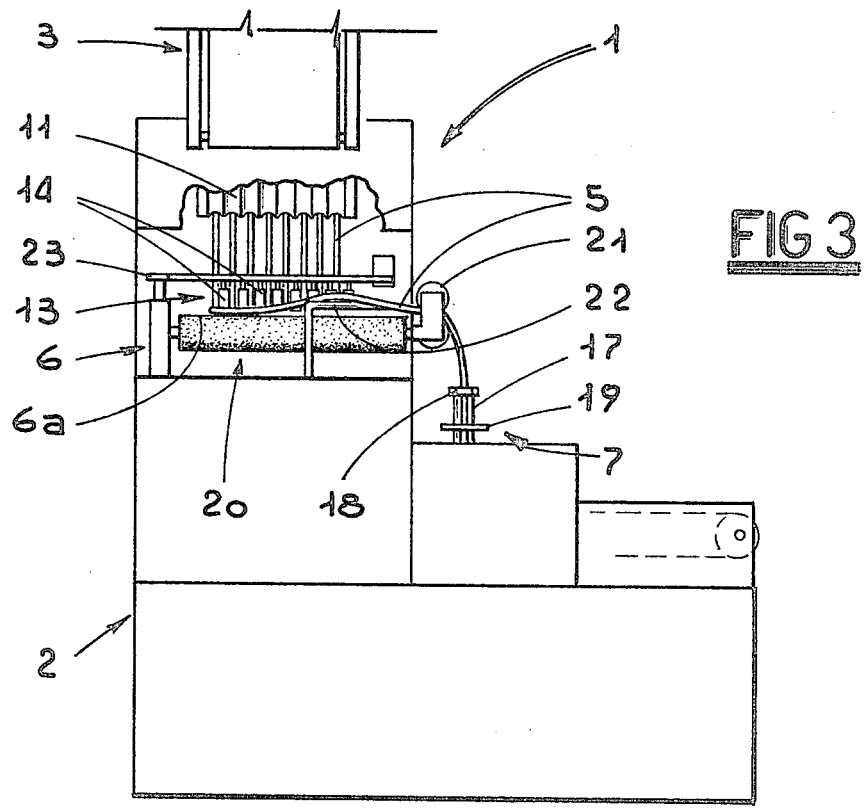

In the first embodiment of the invention shown in FIGS. 1-3, the drive and guide means 6 comprise elements of support in the form of a conveyor belt 20 and deviation rollers 14 having the axis of rotation perpendicular to the conveyor belt 20 and being placed thereon.

The trajectory of each strip of dough 5 thus describes on the conveyor belt 20, two rectilinear sections, namely a first section parallel to the movement direction of the said belt 20, and a second section perpendicular to the preceding one and crosswise to the belt 20 itself. The forming devices 7 are placed side by side at one edge of the conveyor belt 20 and to facilitate the movement of the strips 5, provision is made in the region of the forming devices 7, for driven rollers 21 that move the said strips forward. Furthermore, elements are provided that are designed to reduce, at least in part, contact between the strips of dough 5 and the conveyor belt 20 in the region of the said second section. As can be seen in particular in FIGS. 1 and 3, inserted in the conveyor belt 20 there is a longitudinal element 22 that partially raises the strips 5. FIG. 3 also shows that the deviation rollers 14 are supported so that they hang onto the conveyor belt 20 by a crosspiece 23 fixed to the support frame 2 of the machine 1 and parallel to the deviation line defined by the said rollers.

Additionally, it is stated that the powering and control means 9 connect integrally one to the other, through a chain or belt 24, in the first embodiment of the invention, one thinning roller 11, the conveyor belt 20 and the prime mover 15. Furthermore, through a bevel gear 25 and a shaft 26, the movement of the conveyor belt 20 is transmitted to the forward motion rollers 21.

Figure 4:
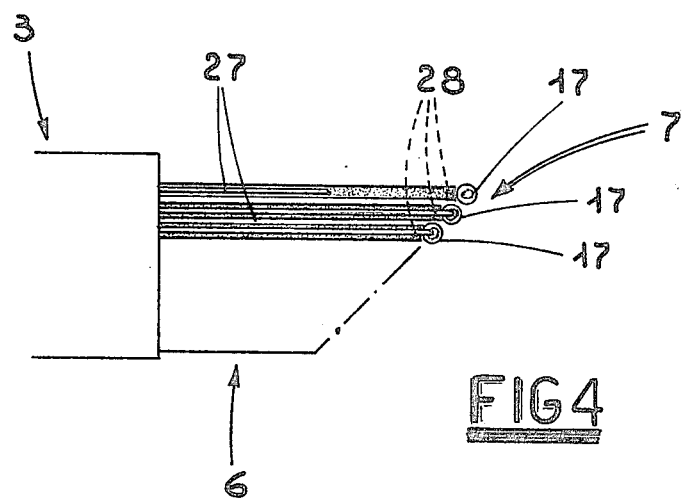
FIG. 4 shows, diagrammatically in a plan view, the second embodiment for the machine according to the invention.

The second embodiment of the invention, shown diagrammatically in FIG. 4, envisages the drive and guide means 6 comprising elements of support defined by a plurality of conveyor ribbons 27 and deviation rollers whose axis of rotation is parallel to the extremity rollers of the former.

The deviation rollers are consecutive to the ribbons 27 and are differently spaced away from the manipulation devices 3. It is important to note that in the specific case illustrated as an unlimited example, the said deviation rollers coincide with the extremity rollers of the conveyor ribbons 27 and are shown at 28. The conveyor ribbons 27 also vary in length, one with respect to the other.

In this particular technical solution, the flow trajectory of each strip of dough 5 is defined by a first section consecutive to the manipulation devices 3, and by a second essentially vertical terminal section that finishes at the forming devices 7.

The ribbons 27 are virtually dimensioned to suit the cross section of the strips 5 and they can be spaced at fixed intervals by means, for example in the form of walls, for positioning or restraining the said strips.

The operation of the machine according to the invention for forming unbroken rings, or similar, of dough can, after the description that has been given in a structural sense, easily be understood.

The machine keeps the strips of dough 5 constantly parallel one with the other and prevents them from being subjected to stress tending to cause curling. The way in which the strips are interspaced in order to compensate for the difference in volume of the manipulation devices and of the forming devices, is achieved simply and originally by making full use of the greater length of the oblique lines compared with the lines perpendicular to the flow direction of the strips. As a consequence of this, namely of harmful tension on the strips 5 not taking place, it has been possible to provide tubular elements 17 that can also be oscillated in the region of the upper extremity thereof and are, therefore, of a particularly simple structure.

Thus the invention achieves the proposed objects. In particular, the fact is underlined that simple means that are easy to make have been utilized.

The invention as described herein is liable to undergo numerous modifications and variants, all of which falling within the conceptual framework of the invention.

Furthermore, all parts may be replaced with others that are technically equivalent.

In practice, the materials utilized, as also the shapes and sizes of these can vary unlimitedly to suit the requirements.

What is claimed is:

1. Machine for forming enclosed shapes, such as rings, of dough out of strips of moistened and kneaded flour, comprising: devices for manipulating the moistened and kneaded flour and for creating from this, a plurality of continuous side by side strips of dough, devices for forming individual enclosed shapes out of said strips of dough, drive and guide elements for channelling said strips of dough from said manipulation devices to said forming devices, and means for powering and controlling all of said devices and said drive and guide elements, wherein the structure of said drive and guide elements is such as to constantly keep said strips of dough virtually parallel with one another and to give each of said strips a flow trajectory defined by a succession of essentially rectilinear sections, angularly deviated, by a plurality of deflection means, placed side by side, along at least one deviation line inclined with respect to the flow trajectory, the strips being forwarded downwards the deviation line, inclined with respect to the flow trajectory, in such a way as to define between each couple of strips therebelow, a distance greater than that one between each couple of strips of dough over the flow trajectory, thereby corresponding to the distance between the forming devices.

2. Machine according to claim 1, wherein the said drive and guide means comprise: elements of support designed to define a support surface placed immediately downstream of the said manipulation devices, for sustaining the first of said recilinear sections that define said flow trajectory of each of said strips, and means of transmission constituted by deviation rollers, one at the side of the other, along said deviation line, that separate at least said first section of each of said strips from the one next thereto.

3. Machine according to claim 1, wherein the terminal sections of said strips that end at said forming devices are virtually vertical and define, with the sections previous thereto, planes parallel one with the other.

4. Machine according to claim 3, wherein said forming devices comprise tubular elements that are virtually vertical and are all integral with a sustaining bar that can be oscillated in a plane essentially perpendicular to the axes of said tubular elements, the extremities of said sustaining bar being engaged by mechanical elements operated by said powering and control means.

5. Machine according to claim 2, wherein said deflection means comprise deviation rollers are virtually perpendicular to said support surface and are placed in the region thereof, and said flow trajectory of each of said strips is essentially defined by a first and by a second section on said support surface, said first section extending from said manipulation devices to said deviation rollers, and said second section, virtually perpendicular to the former, extending from said deviation rollers to one edge of said support surface, as well as by a third virtually vertical terminal section perpendicular to the second section, extending from said support surface to said devices for forming the shaped pieces of dough.

6. Machine according to claim 5, wherein said elements of support comprise at least one conveyor belt that extends in a direction virtually aligned with said strips of dough delivered by said manipulation devices, and wherein said deviation rollers define one said first section parallel to the direction in which the said conveyor belt extends, and one said second section perpendicular to the said direction.

7. Machine according to claim 6, wherein said elements of support comprise, furthermore, members designed to reduce, at least in part, contact between said strips of dough and said conveyor belt in the region of said second section of each of said strips.

8. Machine according to claim 6, wherein said drive and guide means comprise rollers for moving forward said strips, placed adjacent to one edge of said at least one conveyor belt.

9. Machine according to claim 6, wherein said deviation rollers are sustained hanging onto said conveyor belt by a fixed crosspiece overhead of the said conveyor belt and parallel to the deviation line.

10. Machine according to claim 1 or 2, wherein the said powering and control means comprise, furthermore, transmission elements designed to connect in an integral fashion, one to the other, with respect to the rotation, thinning rollers in said manipulation devices, one transmission roller of said conveyor belt, and a shaft connected to said forward motion rollers.

11. Machine according to claim 5, wherein said deviation rollers are virtually parallel to said support surface and are placed terminally thereto, and wherein said flow trajectory of each of said strips is essentially defined by a first section that extends on said support surface from said manipulation devices to said deviation rollers, and by a second terminal section that extends vertically from said deviation rollers to said forming devices.

12. Machine according to claim 11, wherein said elements of support are defined by a plurality of conveyor ribbons side by side, one per strip, and said deviation rollers are the terminal transmission rollers of the said conveyor ribbons, the latter varying in length, one with respect to the other, so as to define terminally said deviation line.

13. Machine according to claim 12, wherein said conveyor ribbons are spaced at fixed intervals, one from the other, by means for positioning said strips.

* * * * *